Patented Apr. 20, 1943

2,317,155

UNITED STATES PATENT OFFICE 2,317,155

POLYMERIC IMINOETHER HYDROHALIDES

Donald Drake Coffman and Frank C. McGrew, Wilmington, Del., assignors to E. I. du Pont de Nemours & Company, Wilmington, Del., a corporation of Delaware No Drawing. Application September 4, 1940, Serial No. 355,413

21 Claims. (Cl. 260—2)

This invention relates to polymeric products and more particularly to new polymeric salts.

This invention has as an object the preparation of polymeric iminoether hydrohalides. Another object is the preparation of materials capable of being hydrolyzed to polyesters. Other objects of the invention will appear hereinafter.

These objects are accomplished by the following invention wherein a hydrogen halide having a boiling point below −50° C. is reacted under substantially anhydrous conditions with at least one compound having at least two, but preferably only two, iminoether functions selected from the class consisting of alcohol and mercaptan groups attached to hydrogen bearing carbon and nitrile groups, said functions, when only one is nitrile, being separated by a chain of at least four contiguous atoms between the nitrile carbon and the carbon attached to the complementary iminoether function, said compound or compounds being so chosen that the iminoether functions of at least one of them comprise at least on nitrile group and so chosen that there are present substantial amounts of complementary iminoether functions.

In a preferred form of the invention a dinitrile is reacted under substantially anhydrous conditions at a temperature below 50° C. with a diol having at least one hydrogen on each of carbon and a hydrogen halide whose boiling point at atmospheric pressure lies below −50° C.

The term "diol" is used herein to define a compound having two hydroxyl, two thiol, or one hydroxyl and one thiol groups stemming from different only singly bonded carbon atoms, each of which is also attached to at least one hydrogen atom. These compounds may also be defined as organic compounds having two alcohol, two mercaptan or one alcohol and one mercaptan groups attached to different aliphatic carbon atoms, each of which is also attached to at least one hydrogen atom. The term "polyol" is similarly employed to define a compound having a plurality of alcohol and/or mercaptan groups. The products of this invention are polymeric and preferably linear polymeric materials having a plurality of iminoether hydrohalide groups. Alternatively the products of this invention are materials which are hydrolyzed in neutral aqueous solutions below 40° C. with the formation of ammonium halide and polymeric materials whose alkali saponification products contain the salt of a polycarboxylic acid and polyol and preferably a diol wherein "polyol" and "diol" have the meanings set forth above.

The preferred process of the present invention is conducted substantially as follows: An anhydrous inert liquid medium containing equivalent amounts of a dinitrile and a diol is agitated in a reactor which is maintained at a temperature preferably between −10° C. and 20° C. by external cooling. Anhydrous gaseous hydrogen halide is introduced until at least an equivalent weight has been absorbed. During this period, or during subsequent storage at a temperature below 50° C., a solid precipitate forms. When the amount of precipitate no longer increases, it is separated by filtration, washed with an inert solvent and allowed to dry until the odor of hydrogen halide has disappeared.

The products of the invention are polymeric, preferably linear polymeric, iminoether hydrohalides containing the recurring functional group

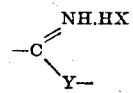

in which X represents a chlorine or bromine (both of whose hydrides boil below −50° C. at atmospheric pressure), and Y is an element, having an atomic weight less than 33, of the sixth group of the periodic system, i. e., is oxygen or sulfur. The polymers are also uniquely characterized by their hydrolysis products. When such a polymer is disolved in water and stored at a temperature between 20 and 40° C., hydrolysis occurs and there are formed ammonium halide and a polyester whose recurring functional group is represented as follows:

where Y is oxygen or sulfur. The polyester reacts with alcoholic caustic alkali at a temperatuer of 100° C. to produce the alkali salt of a dicarboxylic acid and a polyol, preferably a diol.

The more detailed practice of the invention is illustrated by the following examples, wherein parts given are by weight. There are of course many forms of the invention other than these specific embodiments.

*Example I*

A reaction mixture comprising 2702 parts of adiponitrile and 2953 parts of hexamethylene glycol dissolved in 10,000 parts of anhydrous dioxane is placed in a vessel having three openings fitted, respectively, with an inlet tube reaching nearly to the bottom, a stirring device, and an exit tube protected from the ingress of atmospheric moisture by a drying tower. The contents of the reactor are cooled to 0° C. by an external bath. During two hours, 4700 parts (158% excess) of dry hydrogen chloride is passed into and absorbed by the well-stirred reaction mixture. During the absorption of hydrogen chloride the temperature of the mixture rises spontaneously to 35° C. and then falls to 0° C. While the temperature is maintained at 0° C., stirring of the mixture is continued for 16 additional hours. At the end of this time the precipitation of a solid in the reaction mixture is complete, as indicated by the fact that no more precipitation is observed after the solid is separated by filtration. The product is washed by trituration with dry ether and is filtered and dried in vacuo until the volatile excess hydrogen halide and solvent are removed. This procedure results in 7300 parts of (97% of the theoretical yield) of an amorphous white powder consisting of polymeric hexamethylene adipodiimidate hydrochloride, which has the following properties:

Under hydrolytic conditions this polyiminoether hydrochloride is converted to a polyester. Five parts of the hydrochloride is dissolved in water and allowed to stand at 25° C. for three hours, during which time a waxy precipitate separates and ammonium chloride accumulates in the supernatant liquid. The solid waxy product (2.7 parts dry weight, 71% of the theoretical yield) is identified as a polyester by its molecular weight and by its hydrolysis to its monomeric ingredients.

Molecular weight determination: calculated for polyhexamethylene adipate, $C_{12}H_{20}O_4$ (per unit), 228; found (ebullioscopically in benzene), 730, 630, and 670 (average 2.9 units). Two parts of this polyester dissolved in methanol containing 8 parts of potassium hydroxide is heated under reflux for five hours. The resulting solution is evaporated to dryness and acidified with aqueous hydrochloric acid. The precipitate thus formed is identified, after being dried, as adipic acid by its melting point (149° C.) which is unchanged by admixture with an authentic specimen of adipic acid.

When 20 parts of the hydrochloride is heated for one hour at 110° C. under a pressure of 2 mm., there is formed 8 parts (83% of the theoretical yield) of adipamide identified by its melting point (218–19° C.) which is not depressed when mixed with an authentic specimen of adipamide. The second decomposition product consists of hexamethylene dichloride (3 parts) boiling at 195–200° C.

*Example II*

A reaction mixture comprising adiponitrile (108 parts) and 1,10-decanedithiol (206 parts) dissolved in 1,000 parts of dry dioxane is treated at 0° C. with anhydrous hydrogen chloride (152 parts; 108% excess) during one hour. The mixture is then stirred for five additional hours at 0° C. and subsequently allowed to stand at 5° C. for four days. A solid precipitate of polymeric decamethylene adipodithioimidate hydrochloride is formed. This is isolated by washing thoroughly with dry ether, and is then dried. The yield is 378 parts which amounts to 98% of the theoretical amount.

Analysis: calculated for $C_{16}H_{32}N_2S_2Cl_2$ (per unit): N, 7.23, found: (Dumas) N, 7.46.

Ten parts of the polymer is dissolved in 300 parts of water, and the mixture kept at 25° C. The precipitate, which forms during the first 2 hours and is separated by filtration and dried, consists of polydecamethylene dithioladipate.

Molecular weight determination: calculated for $C_{16}H_{28}O_2S_2$ (per unit): 316.5. Found: molecular weight (ebullioscopically in benzene), 704 and 706 (average 2.2 units). The saponification of the polydecamethylene dithioladipate yields decamethylene dithiol and adipic acid.

*Example III*

A mixture of terephthalonitrile (128 parts) and bis(beta-hydroxyethyl) ether (106 parts) dissolved in 1,000 parts of dry dioxane is cooled to 5° C. and thoroughly stirred. During four hours, dry hydrogen bromide (244 parts, 51% excess) is introduced continuously. A temperature of 5° C. is maintained for 40 hours while the formation of a precipitate is completed. The product, isolated by diminished pressure evaporation of the solvent and excess hydrogen bromide, comprises 385 parts (97% of the theoretical yield) of an amorphous light yellow solid. It is identified as polymeric beta-beta'-oxybis(ethyl) terephthalodiimidate hydrobromide by the isolation and identification of its hydrolytic and pyrolytic transformation products as in the manner described in Example I.

*Example IV*

A mixture of 96 parts of oxy-bis(acetonitrile) and 110.5 parts of glycerol beta-monochlorohydrin dissolved in 700 parts of dry chloroform is treated at 10° C. with anhydrous hydrogen chloride (95 parts; 35% excess) during 12 hours. At the end of this time the reaction mixture has become too solid to permit effective stirring. The polymeric 2-chlorotrimethylene oxy-bis-(acetimidate) hydrochloride

formed is isolated by washing the precipitate thoroughly with ether, and amounts to 200 parts (69% of the theoretical yield).

*Example V*

A solution of 46 parts of propanol-1-thiol-3 in 850 parts of diethyl ether is cooled to −15° C. Anhydrous hydrogen chloride is then introduced until the gain in weight amounts to 36.5 parts. While this mixture is maintained at −15° C., 26 parts of cyanogen is introduced during four hours. The reaction mixture is then allowed to warm to 0° C. during four additional hours. The insoluble amorphous solid product thus obtained is thoroughly washed with ether and dried. There is thus obtained 95 parts (88% of the theoretical yield) of polymeric trimethylene oxalomonothiodiimidate hydrochloride which reacts with water to form ammonium chloride and a polyester whose saponification products comprise oxalic acid and propanol-1-thiol-3.

The foregoing examples illustrate the application of the preferred process of this invention to the preparation of representative specific linear polyiminoether hydrohalides. Other new and useful linear polymeric iminoether halides can be similarly prepared from any dinitrile free from groups, other than nitrile, reactive with hydroxyl or thiol, and any diol having at least one hydrogen on each ol carbon. The operable di-nitriles may be formulated as NC—R—CN in which R is a bivalent organic radical, or is non-existent. (In the case of cyanogen, employed in Example V, R is absent.) The bivalent radical joining the nitrile groups may be aliphatic or aromatic, cyclic or acyclic, homocyclic or heterocyclic, saturated or unsaturated, and may be unsubstituted or substituted by groups which do not interfere with the polymer-forming reaction. The dinitrile may contain alcohol- and thiol- unreactive groups, for example, ether, sulfide, ketone, ester, amide, halogen, amine and the like. Specific suitable dinitriles are the following: malononitrile, succinonitrile, glutaronitrile, adiponitrile, pimelonitrile, suberonitrile, azelanitrile, sebaconitrile, isophthalonitrile, phthalonitrile, 1,8-naphthalonitrile, hexahydroterephthalonitrile, beta-phenyladiponitrile, beta-methyladiponitrile, 4-ketopimelonitrile, 1,9-dicyano-5-nonanone, metaphenylene-bis(oxyacetonitrile), 3-nitrophthalonitrile, beta-cyanoethyl cyanoacetate, N-(beta-cyanoethyl)cyanoacetamide, alpha-amino-adiponitrile, and 1,4-dicyanobutene-2. Preferably the radical joining the nitrile groups is a bivalent hydrocarbon radical. A mixture of two or more dinitriles may be used.

As indicated above, any diol having at least one hydrogen atom on each of the two ol carbon atoms, i. e., any organic compound having on each of two separate only singly bonded carbon atoms, one hydroxyl or thiol group, and at least one hydrogen atom, may be employed. The operable diols may be diprimary, disecondary, or primary-secondary. A suitable compound may be formulated as HY—R—YH, wherein Y is a chalcogen, (J. Am. Chem. Soc. 63, 889,892 (1941)), i. e., a member of the oxygen group of elements and has an atomic weight less than 33, i. e., is oxygen or sulfur, and R is a bivalent organic radical, the two valences of which stem from two different carbons which also are each attached to at least one hydrogen. The bivalent organic residues attached to the ol carbon atoms may be aliphatic or aromatic, cyclic or acyclic, homocyclic or heterocyclic, saturated or unsaturated, and unsubstituted or substituted by groups which do not interfere with the reaction such as ether, sulfide, ester, amide, nitro, ketone, halogen, and amine. Specific suitable diols, in addition to those disclosed in the examples, include the following: ethylene glycol, decamethylene glycol, octadecamethylene glycol, diethylene glycol, 1,4-cyclohexanediol, p-xylylene glycol, camphene glycol, 2,4-dihydroxyhexane, 1,5-dimercapto-3-oxapentane, 1,5-dimercapto-3-thiapentane, 2-mercaptoethanol, bis(beta(beta-hydroxyethoxy)ethyl) ether, 1,6-hexanedithiol, 1,3-propanedithiol, 2-methylpentane-1,3-dithiol, 2-ethylhexane-1,3-dithiol, 10-mercaptodecanol-1, 6-mercaptohexanol-1, 1,5-dihydroxy-3-thiapentane, 2,2-dimethyl-propanediol-1,3, 1,12-octadecanediol, and 1,3-cyclohexanedithiol. A preferred class of compounds comprises the completely aliphatic diols. Among them, the polymethylene diols are the more desirable. Aliphatic glycols and polymethylene glycols are further preferred. A dinitrile-diol combination such that the repeating unit of the resulting polymer contains more than six contiguous atoms, to minimize cyclization, is preferred. Mixtures of diols may be employed.

The invention has been given in detail for the reaction of bifunctional compounds which result in the very greatly preferred linear polymeric materials. The invention is, however, generic to the reaction of polyols (polyhydric alcohols and polymercapto compounds) with polynitriles with the appropriate hydrogen halides. The invention thus includes tri-, tetra, etc., hydric alcohols and mercaptans, trinitriles, etc.

Although a diluent is not necessary, its use is more convenient and is advantageous. The diluent employed as the reactant medium serves to effect a homogeneous mixture of the ingredients and to moderate the vigor of the reaction by dissipating the heat generated. The only requirements for a suitable diluent are that it be miscible with the ingredients and inert, i. e., unreactive toward any of the components of the mixture. In addition to the solvents disclosed in the example, the following liquids are also operable: benzene, carbon tetrachloride, methylene dichloride, ethylene glycol dimethyl ether, dimethyl ether, diisopropyl ether, and dibutyl ether. The operable quantity of diluent is not restricted. The use of a very large proportion of solvent, which results in high dilution of the reactants, favors the cyclization of the polymeric iminoether hydrohalides. Cyclic products containing more than two iminoether hydrohalide groups thus formed are within the scope of the invention, since they are polymers containing a plurality of iminoether hydrohalide groups.

The relative amounts of dinitrile and diol employed in the foregoing examples are substantially those of chemical equivalency. It is permissible to depart somewhat from this ratio of ingredients without going beyond the scope of the invention. The effect of using an excess of one ingredient over the other is that (1) the reactant present in greater than the stoichiometrical amount may not be completely consumed, and (2) the polymer chain has a shorter average length. The excess of either ingredient over the other is kept below 50% and preferably below 10% for the most economical use and the highest yield of polymeric product.

The hydrogen halides to be employed are those whose boiling points lie below $-50°$ C. at atmospheric pressure, namely, the hydrogen chloride and hydrogen bromide employed in the examples. Hydrogen chloride is preferred for economic reasons since it is considerably less costly on an equivalent weight basis. The quantity of hydrogen halide used should be at least chemically equivalent to the dinitrile or thiol, whichever is present in the smaller proportion. In case either the dinitrile or the diol contains a basic group, additional hydrogen halide sufficient to saturate this group is required, over and above the requirement for the process of the invention. If less than this amount of hydrogen halide is present, a polymeric iminoether hydrohalide is still obtained, but the formation of his product does not proceed to completion and an undesirably low yield results. It is preferable to use an excess of hydrogen halide which suitably amounts to 10–200%. While a still greater excess may be employed, it is usually avoided because (1) it does not facilitate the process and (2) the operation of removing the unreacted hydrogen halide from the product is unnecessarily prolonged.

The temperature at which the reaction is conducted must be maintained sufficiently low to avoid the decomposition of the iminoether groups. Side reactions resulting in such decomposition occur at temperatures as low as 50° C.

when excess hydrogen halide is present. Thus it is necessary to conduct the reaction and the isolation of the product at temperatures below 50° C. and preferably below 20° C. At still lower temperatures the reaction proceeds more slowly and the duration of the process must be prolonged to attain complete reaction. Any temperature below 20° C. is satisfactory as long as it is sufficiently high so that the components of the reaction mixture do not freeze out. It is usually desirable to operate above —10° C. to maintain a homogeneous mixture of the reactants.

The order in which the reactants are brought into contact is immaterial. Thus, it is permissible to add the diol to a mixture of the dinitrile and hydrogen halide or to mix all the ingredients simultaneously.

The apparatus in which the process is conducted is, in general, constructed of a material resistant to the action of hydrogen halide and is not limited to any particular design, although the reaction conditions may make certain features of construction desirable. Thus, either subatmospheric, atmospheric, or superatmospheric pressure may be employed and the vessel should be designed to permit stirring of the contents and to exclude atmospheric moisture under the pressure used. For example, if dimethyl ether is used as a solvent or diluent, superatmospheric pressure is required to prevent its vaporization in the operable temperature range of the process. The process is not limited to any particular conditions of illumination.

As an alternative to the preferred process described above, polymeric materials containing a plurality of iminoether hydrohalides may also be prepared from selected hydroxy- or mercaptonitriles. In this alternative process any organic mononitrile containing one and only one —YH group attached to only singly bonded hydrogen-bearing carbon in which Y is an element of the sixth group of the periodic table of atomic weight less than 33, where the —CN and —YH groups are separated by a ring or by a chain of at least five contiguous atoms may be reacted under anhydrous conditions with the hydrogen halide boiling below —50° C. Examples of such starting materials include 6-hydroxycapronitrile, 6-mercaptocapronitrile, p-cyanobenzyl alcohol and 10-hydroxycaprinitrile. These are converted to polymeric iminoether hydrohalides by condensation at a temperature below 50° C. with a hydrogen halide by the methods disclosed for the preferred process starting with diol and dinitrile. The conditions of reaction are the same in both cases.

This invention is of use in preparing heretofore unknown compositions of matter. The products themselves are useful as raw materials for the preparation of polyesters and polythiolesters by a new procedure as disclosed above. They also possess utility in the control of insect pests since they exhibit activity as stomach poisons for such forms of life.

The term "iminoether hydrohalide function" is used herein to denote the nitrile, alcohol and mercaptan groups, the later two being complementary with the nitrile group to form the iminoether hydrohalide with the hydrogen halide used.

The above description and examples are intended to be illustrative only. Any modification of or variation therefrom which conforms to the spirit of the invention is intended to be included within the scope of the claims.

What is claimed is:

1. Process for preparing polymeric iminoether hydrohalides which comprises reacting, under anhydrous conditions at a temperature below 50° C., a hydrogen halide having a boiling point below —50° C. with a polynitrile free from groups reactive, at the reaction temperature, with the nitrile group and free from groups, other than the nitrile groups, reactive at the reaction temperature with —YH groups, wherein Y is a chalcogen of atomic weight less than 33, and an organic compound having a plurality of —YH groups attached, through different, only singly bonded, hydrogen bearing carbon atoms to an organic radical free from groups reactive, at the reaction temperature, with —YH groups and, apart from the —YH groups, with nitrile groups.

2. Process for preparing polymeric iminoether hydrohalides which comprises reacting, under anhydrous conditions at a temperature below 50° C., a hydrogen halide having a boiling point below —50° C. with a dinitrile free from groups reactive, at the reaction temperature, with nitrile groups and free from groups, other than the nitrile groups, reactive at the reaction temperature with —YH groups, where Y is a chalcogen of atomic weight less than 33, and a compound having two —YH groups attached to a divalent organic radical free from groups reactive, at the reaction temperature, with the nitrile group and the —YH group through different, only singly bonded, hydrogen bearing carbon atoms of said organic radical.

3. Process which comprises reacting under anhydrous conditions at a temperature between —10° C. and 20° C. a dinitrile otherwise free from groups reactive with alcohols including thioalcohols with a hydrogen halide whose boiling point at atmospheric pressure lies below —50° C. and an organic compound having two and only two —YH groups attached to only singly bonded hydrogen bearing carbon, Y being a member of the oxygen group of elements of atomic weight less than 33 said organic compound being otherwise free from groups reactive with the nitrile group.

4. Process of claim 3 wherein the radical joining the nitrile group is a bivalent hydrocarbon radical.

5. Process of claim 3 wherein the hydrogen halide is hydrogen chloride.

6. Process of claim 3 wherein the organic —YH compound has the —YH groups joined by a hydrocarbon radical.

7. Process of claim 3 wherein the dinitrile is reacted with hydrogen chloride and a polymethylene diol.

8. Process for preparing polymeric iminoether hydrohalides which comprises reacting, under anhydrous conditions at a temperature between —10° C. and 20° C., a dinitrile wherein the nitrile groups are separated by a bivalent hydrocarbon radical, with a hydrogen halide having a boiling point below —50° C. and an organic compound having two —YH groups separated by a bivalent hydrocarbon radical and attached to said radical through only singly bonded, hydrogen bearing carbon atoms thereof, Y being a chalcogen of atomic weight less than 33.

9. Process for preparing polymeric iminoether hydrohalides which comprises reacting, under anhydrous conditions at a temperature between −10° C. and 20° C., a dinitrile wherein the nitrile groups are separated by a bivalent aliphatic hydrocarbon radical with a hydrogen halide having a boiling point below −50° C. and an organic compound having two —YH groups separated by a bivalent aliphatic hydrocarbon radical, the free valences of which stem from hydrogen bearing, only singly bonded carbon atoms, Y being a chalcogen of atomic weight less than 33.

10. Process for preparing polymeric iminoether hydrohalides which comprises reacting, under anhydrous conditions at a temperature between −10° C. and 20° C., a polymethylene dinitrile with a compound having two —YH groups separated by a polymethylene radical, Y being a chalcogen of atomic weight less than 33.

11. Process which comprises reacting adiponitrile under anhydrous conditions at a temperature below 50° C. with hydrogen chloride and a polymethylene diol.

12. A linear polymeric organic material having a plurality of recurring iminoether hydrohalide groups

wherein HX is a hydrogen halide boiling below −50° C., Y is an element of the sixth group of the Periodic system having an atomic weight of less than 33 and the recurring units are separated by bivalent organic radicals free from groups reactive with the —CN and —YH groups, in which radicals the free valences stem from carbon and in which radicals the carbon joined to the recurring —Y— atom is hydrogen bearing and only singly bonded.

13. The process as in claim 3 in which the diol is a polymethylene diol.

14. Product according to claim 3 wherein the diol is a polymethylene diol and the dinitrile is adiponitrile.

15. A linear polymeric organic material having a plurality of recurring units of the formula

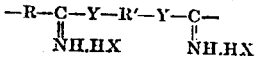

wherein R is a bivalent hydrocarbon radical, R′ is a bivalent hydrocarbon radical joined to —Y— by only singly bonded hydrogen bearing carbons, Y is a chalcogen of atomic weight less than 33 and HX is a hydrogen halide boiling below −50° C.

16. A linear polymer according to claim 15, wherein R and R′ are polymethylene radicals.

17. A linear polymer according to claim 15, wherein R is the tetramethylene —(CH₂)₄— radical.

18. A linear polymeric organic material having a plurality of recurring units of the formula

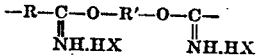

wherein R is a bivalent hydrocarbon radical, R′ is a bivalent hydrocarbon radical joined to —O— by only singly bonded hydrogen bearing carbons, and HX is a hydrogen halide boiling below −50° C.

19. A linear polymer according to claim 18, wherein R and R′ are polymethylene radicals.

20. Linear polymeric hexamethyleneadipodiimidate hydrochloride.

21. Linear polymeric decamethyleneadipodithioimidate hydrochloride.

DONALD DRAKE COFFMAN.
FRANK C. McGREW.

CERTIFICATE OF CORRECTION.

Patent No. 2,317,155.                                                April 20, 1943.

DONALD DRAKE COFFMAN, ET AL.

It is hereby certified that error appears in the printed specification of the above numbered patent requiring correction as follows: Page 1, first column, line 22, for "on" read --one--; line 53, before "polyol" insert --a--; page 2, first column, line 21, after "parts" strike out --of--; page 3, second column, line 17, for "example" read --examples--; page 4, first column, line 69, for "later" read --latter--; and that the said Letters Patent should be read with this correction therein that the same may conform to the record of the case in the Patent Office.

Signed and sealed this 8th day of June, A. D. 1943.

Henry Van Arsdale,
Acting Commissioner of Patents.

(Seal)